Figure 1:
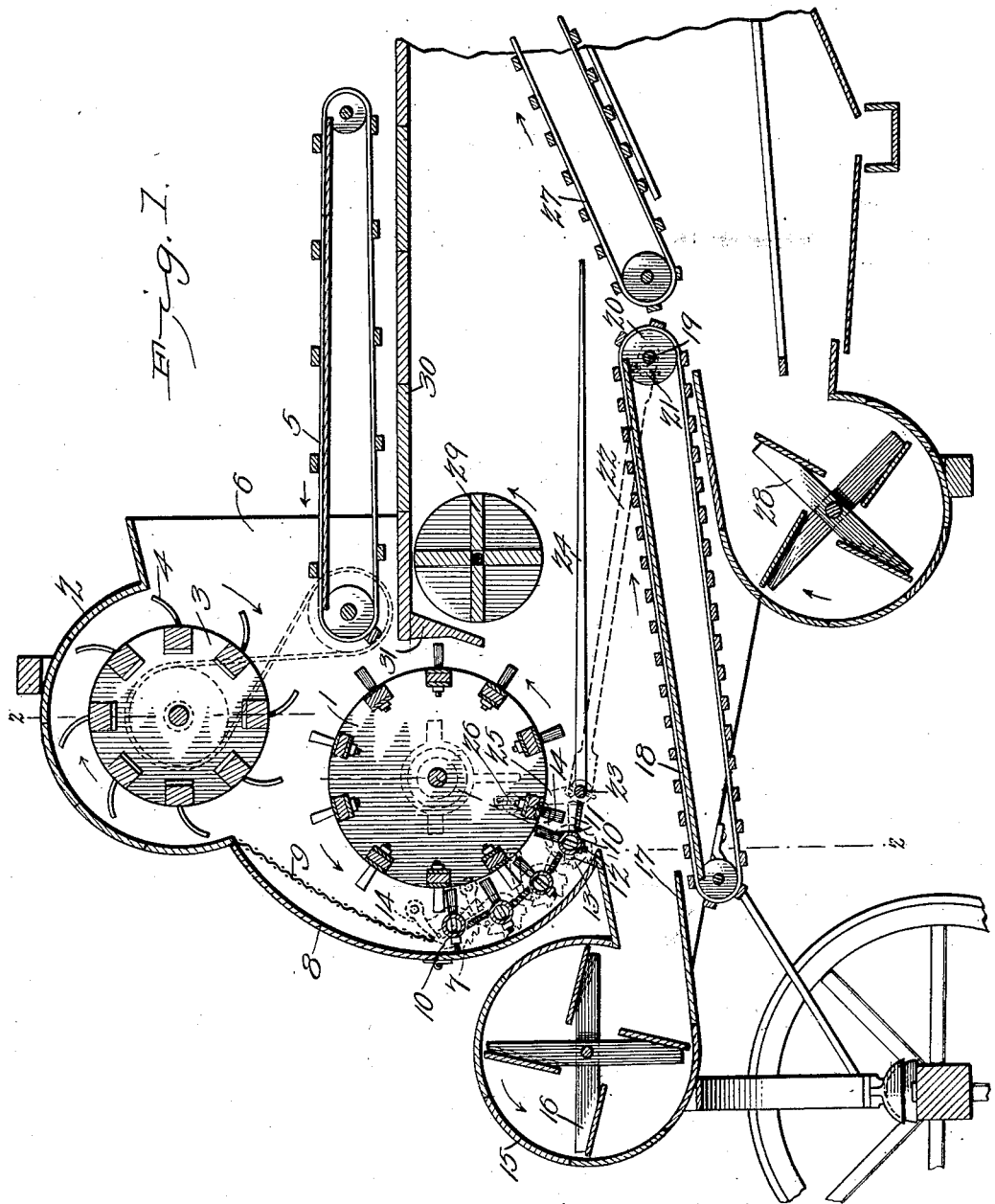

No. 759,391. PATENTED MAY 10, 1904.
J. McGRANE.
THRESHING MACHINE.
APPLICATION FILED MAR. 23, 1903.
NO MODEL. 2 SHEETS—SHEET 1.

Witnesses
James McGrane, Inventor,
by
Attorneys

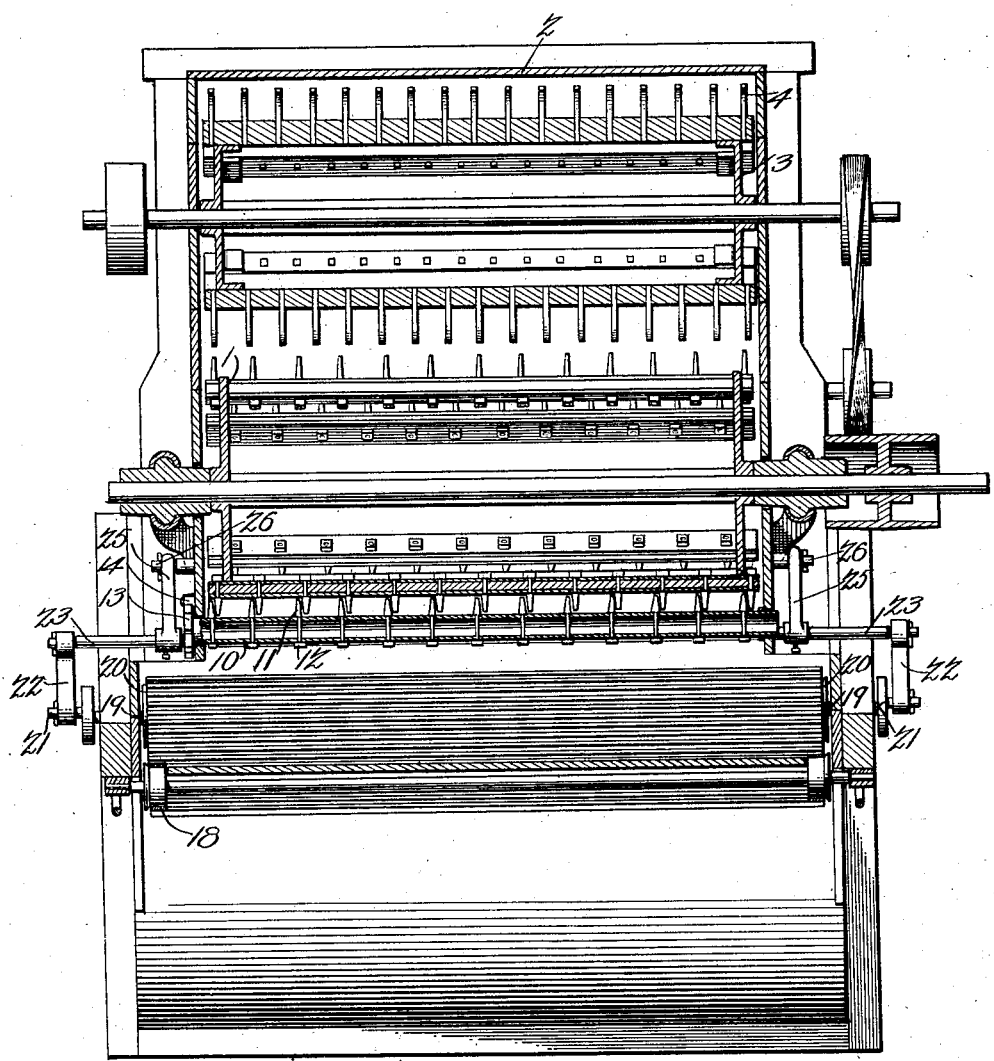

No. 759,391.  
Patented May 10, 1904.

UNITED STATES PATENT OFFICE.

JAMES McGRANE, OF ROMULUS, NEW YORK.

THRESHING-MACHINE.

SPECIFICATION forming part of Letters Patent No. 759,391, dated May 10, 1904.

Application filed March 23, 1903. Serial No. 149,185. (No model.)

*To all whom it may concern:*

Be it known that I, JAMES McGRANE, a citizen of the United States, residing at Romulus, in the county of Seneca and State of New York, have invented a new and useful Threshing-Machine, of which the following is a specification.

This invention relates to threshing-machines; and it has for its object to provide a machine of this class which shall possess superior advantages in point of simplicity, durability, and general efficiency.

With these ends in view the invention consists in the improved construction and arrangement of parts, to be hereinafter more fully described, whereby grain may be fed automatically to the threshing-cylinder, in means for retarding the feeding of the grain, and in divers other improvements in the construction and arrangement of parts, which will be hereinafter fully described, and particularly pointed out in the claims.

In the drawings hereto annexed, Figure 1 is a longitudinal vertical sectional view of the front portion of a threshing-machine constructed in accordance with the principles of my invention. Fig. 2 is a transverse sectional view taken on the line 2 2 in Fig. 1.

Corresponding parts in both figures are indicated by similar numerals of reference.

Within the casing of the machine is mounted the threshing-cylinder 1, which is of ordinary construction. The casing is extended upwardly so as to form a hood 2, within which is journaled a retarding-cylinder 3, having curved prongs 4, which receive the grain from the endless carrier 5 of the feed-table, which is disposed upon the deck of the machine in rear of the cylinder, the throat or opening 6, through which the grain is fed, being disposed in rear of and above the said cylinder. It will thus be seen that my improved machine has what is sometimes termed "overshot" feed. The retarding-cylinder, which also serves to feed the grain to the threshing-cylinder, rotates at a comparatively slow rate of speed in the direction of the arrows upon the drawings.

The casing of the machine includes a breast portion 7 in front of the cylinder and a hinged door 8, through which access may be had to the interior. This hinged door is disposed directly below the hood 2, which confines the retarding-cylinder, and directly in rear of said hinged door is placed a screen 9, upon which the partly-threshed grain and straw are violently thrown by the action of the threshing-cylinder. By this action a large portion of the grain is separated and diverted in a downward direction by the breast portion 7, which is preferably constructed of sheet metal, so as to provide a smooth surface which is not easily injured by the wear to which it will be subjected.

The concave of the machine, which is disposed within the breast portion of the casing, is composed of a plurality of transverse bars 10, each provided with a plurality of teeth 11, the shanks of which extend diametrically through said bars and are secured in the usual manner by means of nuts 12. Rigidly secured upon the ends of the bars 10 are ratchet-disks 13, engaged by pawls 14, which are pivotally mounted upon the sides of the casing. It will be seen that by this simple mechanism the bars of the concave may be individually and separately turned or adjusted, so as to place the teeth thereon at any desired angle with relation to the teeth of the cylinder. It is obvious that when the teeth of the concave are disposed at a considerable angle to the teeth of the cylinder grain and straw will be permitted to pass freely between the said cylinder and concave. If the condition of the grain should be such that the kernels adhere stubbornly to the ears, the angle of inclination of the concave-teeth may be reduced, thereby increasing the violence of the operation of the threshing-teeth upon the grain.

A casing 15, disposed below and in front of the breast 7 of the machine, contains a fan 16, by means of which a blast is discharged rearwardly through the throat 17 of the fan-casing, whereby the rearward movement of the material leaving the cylinder and concave is accelerated. An endless carrier for the loose grain and short straw is disposed below the threshing-cylinder and concave. Said endless carrier, which is designated 18, is extended under the discharge-opening of the throat 17 of the fan-case 15, and its upper lead travels in an upward and rearward direction, as indicated by an arrow.

The shaft 19, having the pulleys 20, which support the rear end of the carrier 18, is also provided with cranks 21, connected by rods 22 with a transverse shaft 23, which is provided with rearwardly-extending rake teeth or prongs 24 and with upwardly-extending arms 25, the upper ends of which are pivotally connected at 26 with the sides of the casing. It is obvious that the shaft 23, the prongs 24, and the arms 25 being rigidly connected with each other the movement imparted to the shaft 23, through the medium of the connecting-rods 22, from the cranks 21 will impart to the prongs 24 not only a longitudinally-reciprocating but also a vibratory movement. It will be observed that the rake formed by the elements 23, 24, and 25 is disposed directly in rear of the discharge from the cylinder and concave and in such a position as to receive said discharge, which is thereby subjected to a thorough agitation, which serves to separate the grain from the straw, the grain dropping upon the carrier 18, while the straw is discharged over the rear ends of the prongs 24 onto a straw-carrier, a portion of which is seen at 27 and which serves to convey the straw to the point of discharge. The grain, loose ears, and short straw are conveyed by the carrier 18 to a suitably-constructed cleaning mill, which includes in its construction a fan 28.

A rotary beater 29 is suitably disposed behind the threshing-cylinder under the deck 30 of the machine, which is provided with a depending flange 31, which separates said beater from the threshing-cylinder. Said beater, which rotates in the direction of the arrow, assists in working the straw back over the vibratory prongs 24, its action upon the straw also assisting in separating the grain therefrom.

Belting is to be employed for transmitting motion between the various rotary elements of the device, as will be readily understood.

I have in the foregoing described a simple and preferred construction of my invention; but I desire it to be understood that I do not limit myself to the structural details herein set forth, but reserve the right to any changes, alterations, and modifications which may be resorted to without departing from the spirit and scope of my invention or sacrificing the utility of the same.

Having thus described my invention, I claim—

1. In a threshing-machine, a casing having an extended breast portion, a threshing-cylinder and concave within the latter, a screen disposed within the breast portion above the concave, mechanical means for retarding the feed of material into the cylinder, and a blower disposed in front of the cylinder and discharging a forcible blast directly below and in front of the axis of said cylinder to forcibly assist the discharge of material from the latter.

2. In a threshing-machine, a casing having an extended breast portion, a threshing-cylinder and concave within the latter, a screen disposed above said concave and spaced from the latter at its lower edge to permit grain passing through said screen to slide beneath the concave, and a rearwardly-discharging fan disposed in front of the cylinder and discharging below the latter thereby inducing the passage of threshed grain through the screen.

3. In a threshing-machine, an endless carrier extending under the cylinder and concave, a shaft disposed in rear of the concave and having upwardly-extending arms pivotally connected with the sides of the casing and rearwardly-extending prongs, crank-arms connected with rotary elements of the endless carrier, and rods connecting said cranks with the shaft having the rearwardly-extending prongs.

4. In a threshing-machine, the combination with the threshing mechanism, of a reciprocating and vibratory device disposed in rear of and below said threshing mechanism to receive the discharge therefrom, said device comprising a shaft having upwardly-extending arms pivotally connected with the sides of the casing and rearwardly-extending prongs, an endless carrier disposed beneath said device, crank-arms connected with rotary elements of said endless carrier, and rods connecting said crank-arms pivotally with the transverse shaft of the reciprocating and vibratory device which is thereby operated.

In testimony that I claim the foregoing as my own I have hereto affixed my signature in the presence of two witnesses.

JAMES McGRANE.

Witnesses:
 HENRY J. PILDIN,
 ALEXANDER BALDRIDGE.